United States Patent [19]

Blanchart

[11] 4,447,505
[45] May 8, 1984

[54] FUEL CELL ELECTRODE

[75] Inventor: Alain P. O. Blanchart, Balen, Belgium

[73] Assignee: Electrochemische Energieconversie, N.V., Mol, Belgium

[21] Appl. No.: 326,206

[22] Filed: Dec. 1, 1981

[30] Foreign Application Priority Data

Dec. 13, 1980 [NL] Netherlands ............... 8006774

[51] Int. Cl.$^3$ ............................................. H01M 4/86
[52] U.S. Cl. ........................................ 429/42; 429/44
[58] Field of Search ............... 429/40, 42, 41, 44, 429/45

[56] References Cited

U.S. PATENT DOCUMENTS

| | | | |
|---|---|---|---|
| 3,212,930 | 10/1965 | Thompson et al. | 429/40 X |
| 3,306,779 | 2/1967 | Flannery et al. | 429/42 |
| 3,442,714 | 5/1969 | Matsuno | 429/40 X |
| 3,870,565 | 3/1975 | Bonnemay et al. | 429/40 X |
| 4,048,383 | 9/1977 | Clifford | 429/40 X |
| 4,054,687 | 10/1977 | Kunz | 429/42 X |
| 4,091,175 | 5/1978 | Höhne | 429/40 |
| 4,127,468 | 11/1978 | Olfenaar | 429/40 X |
| 4,129,525 | 12/1978 | Horowitz et al. | 429/40 X |
| 4,263,376 | 4/1981 | Blurton | 429/42 |
| 4,354,958 | 10/1982 | Solomon | 429/42 X |

*Primary Examiner*—Charles F. LeFevour

[57] ABSTRACT

The invention relates to a fuel cell electrode provided with a catalytic layer containing a noble metal on carbon with a relatively low specific surface and a carbon with a relatively high specific surface, of which electrode the catalytic layer contains noble metal on carbon with a specific surface lower than 100 m$^2$ g$^{-1}$ and carbon with a specific surface higher than 150 m$^2$ g$^{-1}$ on which there is at most an equally large percentage by weight of noble metal as on the carbon having a relatively low specific surface.

The invention also relates to a process for preparing such a fuel cell electrode.

14 Claims, No Drawings

FUEL CELL ELECTRODE

The invention relates to a fuel cell electrode provided with a catalytic layer containing a noble metal on carbon with a relatively low specific surface and a carbon with a relatively high specific surface, in particular a gas diffusion electrode.

Such an electrode e.g. is known from the U.K. patent specification No. 1,007,490. According to this patent specification a fuel cell electrode contains a catalytic layer consisting of a hydrophobic binder and either noble metal on graphite only or noble metal on a combination of graphite and activated carbon. The catalytic layer containing noble metal on a combination of graphite and activated carbon is produced by providing an intimate mixture of the graphite and the activated carbon with a desired quantity of noble metal, for instance 2% silver. In such a process the noble metal will spread evenly over the full surface of the two carbons, and after this treatment the activated carbon (relatively high specific surface) will contain a substantially higher percentage by weight of noble metal than the graphite (relatively low specific surface). Also from the German Offenlegungsschrift No. 2,208,632 an electrode is known in the catalytic layer in addition to hydrophobic binder contains graphite and activated carbon provided with catalyst.

These known electrodes have great disadvantages. A fuel cell containing such an electrode has a very poor cell performance and/or shows great instability.

The object of the invention is a fuel cell electrode combining the capacity of producing good cell performance with good stability, i.e. an electrode capable of producing high initial cell performance decreasing only very slowly in course of time. Such an electrode according to the invention is characterized in that the catalytic layer contains noble metal on carbon with a specific surface lower than 100 $m^2\ g^{-1}$, preferably lower than 50 $m^2\ g^{-1}$, and carbon with a specific surface higher than 150 $m^2\ g^{-1}$, preferably between 200 and 1200 $m_2\ g^{-1}$, on which there is at most an equally large percentage by weight of noble metal as on the carbon having a relatively low specific surface, and preferably less or no noble metal. The last-mentioned preference is supported by economic arguments, because the presence of noble metal on the carbon with a relatively high specific surface has only little effect on the performance of the electrode according to the invention, and thus noble metal can be saved.

The carbon for an electrode according to the invention can be suitably provided with noble metal by depositing on this carbon, from a solution, one or more salts of the desired noble metal and subsequently reducing these salts with hydrogen to pure metal. In this process the carbon having a relatively low specific surface must be provided with the noble metal separately in order to be able to obtain, on this carbon, a percentage by weight of noble metal at least as large as on the rest of the carbon used in the electrode.

Very suitable carbons having specific surfaces lower than 100 $m^2\ g^{-1}$ for electrodes according to the invention are graphite, graphitized carbon, low-surface carbon black and in particular etched graphite. This last-mentioned carbon can be suitable prepared by contacting graphite with substances such as peroxide, fluorine or chlorine before applying noble metal to it.

A noble metal for electrodes according to the invention may be, for instance, ruthenium, palladium, silver or platinum. A very suitable noble metal for electrodes according to the invention is platinum. The noble metal preferably occurs in amounts of between 1 and 10% by weight in respect of the carbon having a relatively low specific surface on the carbon having a relatively low specific surface and preferably in amounts of between 0 and 10% by weight in respect of the carbon having a relatively high specific surface on the carbon having a relatively high specific surface.

Suitable carbons having specific surfaces higher than 150 $m^2\ g^{-1}$ for electrodes according to the invention are high-surface carbon black and activated carbon, especially carbon which has been thermally treated.

The weight ratio between the carbon having a relatively low specific surface and the carbon having a relatively high specific surface in an electrode according to the invention preferably ranges between 10:1 and 1:10.

A fuel cell electrode according to the invention preferably consists of a plane electrode with a catalytic layer consisting of noble metal on carbon having a specific surface lower than 100 $m^2/g$, carbon having a specific surface higher than 150 $m^2/g$ and a binder such as polytetrafluorethylene (PTFE), polytrifluorochloroethylene (PTFCE), polyolfins, for instance polypropylene, low density polyethylene or polyisobutene, or epoxy resins, of which PTFE is preferred, preferably in an amount of 3–30 parts by weight per 100 parts by weight of carbon.

The fuel cell electrodes, according to the invention are particularly suitable as cathodes, specifically as air or oxygen cathodes.

The invention also comprises a process for the production of a fuel cell electrode characterized in that in this process carbon having a relatively low specific surface lower than 100 $m^2\ g^{-1}$, preferably lower than 50 $m^2\ g^{-1}$ provided with 1–10% by weight of noble metal, preferably Pt, intimately mixed in a weight ratio of between 10:1 and 1:10 with carbon having a relatively high specific surface higher than 150 $m^2\ g^{-1}$, preferably between 200 and 1200 $m^2\ g^{-1}$, particularly between 250 and 500 $m^2\ g^{-1}$, provided with 0–10% by weight of noble metal, preferably Pt, the percentage by weight of noble metal on the carbon with a relatively low specific surface being higher than or equal to the percentage by weight of noble metal on the carbon with a relatively high specific surface, and with a binder, preferably 3–30 parts by weight PTFE per 100 parts by weight of carbon, is formed into a catalytic layer of the desired dimensions.

The invention will be further elucidated by means of the following experiments. In these experiments the electrode performance has been measured in a $H_2$/KOH (concentration 6 moles per liter)/air cell having an active surface of 289 $cm^2$ at an electrolyte temperature of 338 K. and a constant voltage of 0.69 V with always the same hydrogen anodes, in which experiments the air cathode is replaced each time by those mentioned below.

In these experiments the following carbons were used:

1. Graphite having a specific surface of 12 $m^2\ g^{-1}$ provided with 5% by weight Pt.
2. Activated carbon the specific surface of which had been reduced by thermal treatment from 850 to 300 $m^2\ g^{-1}$ without Pt.

3. Activated carbon having a specific surface of 850 m² g⁻¹ without Pt.
4. Activated carbon having a specific surface of 850 m² g⁻¹ provided with 5% by weight Pt.
5. Carbon black having a specific surface of 200 m² g⁻¹ provided with 5% by weight Pt.
6. Carbon black having a specific surface of 1100 m² g⁻¹ provided with 5% by weight Pt.

The results of these experiments are shown in the following table.

| Experiment no. | carbons used | compostion active layer in wt. % | current density in mA. cm$^{-2}$ | number of hours after start of experiment |
|---|---|---|---|---|
| 1 | 1 + 2 | 1: 60 | 102 | 0 |
|  |  | 2: 25 | 100 | 1000 |
|  |  | PTFE: 15 | 97 | 2500 |
|  |  |  | 94 | 5000 |
| 2 | 1 + 3 | 1: 60 | 96 | 0 |
|  |  | 3: 25 | 89 | 1000 |
|  |  | PTFE: 15 | 85 | 2500 |
|  |  |  | 85 | 5000 |
| 3 | 1 + 4 | 1: 42 | 128 | 0 |
|  |  | 4: 42 | 119 | 1000 |
|  |  | PTFE: 16 | 115 | 2500 |
|  |  |  | 115 | 5000 |
| 4 | 1 + 6 | 1: 65 | 85 | 0 |
|  |  | 6: 20 | 82 | 1000 |
|  |  | PTFE: 15 | 80 | 2500 |
|  |  |  | 80 | 5000 |
| 5 | 1 | 1: 85 | 95 | 0 |
|  |  | PTFE: 15 | 90 | 1000 |
|  |  |  | 85 | 2500 |
|  |  |  | 80 | 5000 |
| 6 | 4 | 4: 85 | 125 | 0 |
|  |  | PTFE: 15 | 91 | 1000 |
|  |  |  | 62 | 2500 |
|  |  |  | 22 | 5000 |
| 7 | 5 | 5: 85 | 115 | 0 |
|  |  | PTFE: 15 | 90 | 1000 |
|  |  |  | 81 | 2500 |
|  |  |  | 47 | 5000 |

Of these experiments, experiments 1, 2, 3 and 4 are according to the invention, experiments 5, 6 and 7 are comparative.

As shown by the above experiments, the electrodes according to experiments 6 and 7 are highly unstable. During further measurements of an electrode according to experiment 5, it was found that with a slight increase in the current drain there would be very strong decrease in voltage. Consequently, electrodes according to experiment 5 are also unsuitable for practical use, where such high current drain is necessary. With the electrodes according to experiments 1, 2, 3 and 4 this current densities had been reached so that electrodes can be used satisfactorily in practice.

I claim:

1. A fuel cell electrode having a catalytic layer composed of two separately prepared intimate mixtures of a noble metal on carbon, the first mixture comprising a noble metal on carbon having a relatively low specific surface area of less than 100 m²g⁻¹, and the second mixture comprising a noble metal on carbon having a relatively high surface area of greater than 150 m²g⁻¹, the amount by weight of noble metal in said second mixture being equal to or less than the amount by weight of nobel metal in said first mixture.

2. A fuel cell electrode according to claim 1 wherein the carbon in said first mixture has a specific surface area of less than 50 m²g⁻¹.

3. A fuel cell electrode according to claim 1 or claim 2 wherein the carbon in said second mixture has a specific surface area between 200 and 1200 m²g⁻¹.

4. A fuel cell electrode according to claim 1 or 2 wherein the carbon in said second mixture has been subject to a thermal treatment.

5. A fuel cell electrode according to claim 1 or 2 wherein the carbon in said first mixture is graphite.

6. A fuel cell electrode according to claim 5 wherein the graphite has been etched.

7. A fuel cell electrode according to claim 1 or 2 wherein the carbon in said second mixture is activated carbon.

8. A fuel cell electrode according to claim 1 wherein the amount of noble metal in said first mixture is from 1 to 10% by weight of the carbon in the first mixture and the amount of noble metal in said second mixture is from 1 to 10% by weight of the carbon in the second mixture, provided that the weight ratio of carbon in said first and second mixtures is between 10:1 or 1:10.

9. A fuel cell electrode according to claim 8 wherein the catalytic layer also contains a binder.

10. A fuel cell electrode according to claim 1 wherein the noble metal is Pt.

11. A fuel cell electrode according to claim 10 containing 3 to 30 parts by weight of binder per 100 parts by weight of carbon.

12. A fuel cell electrode according to claim 11 wherein said binder is polytetrafluorethylene.

13. A fuel cell comprising the fuel cell electrode of claim 1 or 2.

14. A fuel cell battery comprising fuel cells according to claim 13.

* * * * *

UNITED STATES PATENT AND TRADEMARK OFFICE
CERTIFICATE OF CORRECTION

PATENT NO. : 4,447,505
DATED : May 8, 1984
INVENTOR(S) : ALAIN P.O. BLANCHART

It is certified that error appears in the above-identified patent and that said Letters Patent is hereby corrected as shown below:

In the printed patent, at column 1, line 42, "1200 m2g$^{-1}$" should read --1200 m$^2$g$^{-1}$--.
At column 3, in the table, the entry for Experiment no. 2 reads:

"2   1+3  1:96                0
        60"

and should read:

--2  1+3         1:60         96           0--.

Signed and Sealed this

Sixteenth Day of October 1984

[SEAL]

Attest:

GERALD J. MOSSINGHOFF

Attesting Officer

Commissioner of Patents and Trademarks